Jan. 22, 1946.　　　　H. S. PARDEE　　　　2,393,260
SHAFT SEAL
Filed Nov. 20, 1943

Harvey S. Pardee,
Inventor.
Haynes and Koenig,
Attorneys.

Patented Jan. 22, 1946

2,393,260

UNITED STATES PATENT OFFICE 2,393,260

SHAFT SEAL

Harvey S. Pardee, Ravinia, Ill., assignor, by mesne assignments, to Acme Industrial Company, Chicago, Ill., a corporation of Illinois Application November 20, 1943, Serial No. 511,052

5 Claims. (Cl. 288—3)

This invention relates to shaft seals, and with regard to certain more specific features, to rotary shaft seals of the circular sliding- contact type.

Among the several objects of the invention may be noted the provision of a reliable, long-wearing rotary shaft seal which is effective with little friction at high rotary speeds and which requires a minimum of attention; the provision of a seal of the class described which is of compact form particularly applicable to sealing roller or ball type bearings, and wherein valuable axial length is conserved without sacrificing useful peripheral space; and the provision of a seal of this class which may be made up as a pre-fabricated unit for easy assembly with various bearing structures, which assembly is as simple as the assembly operation on the bearing which it serves. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
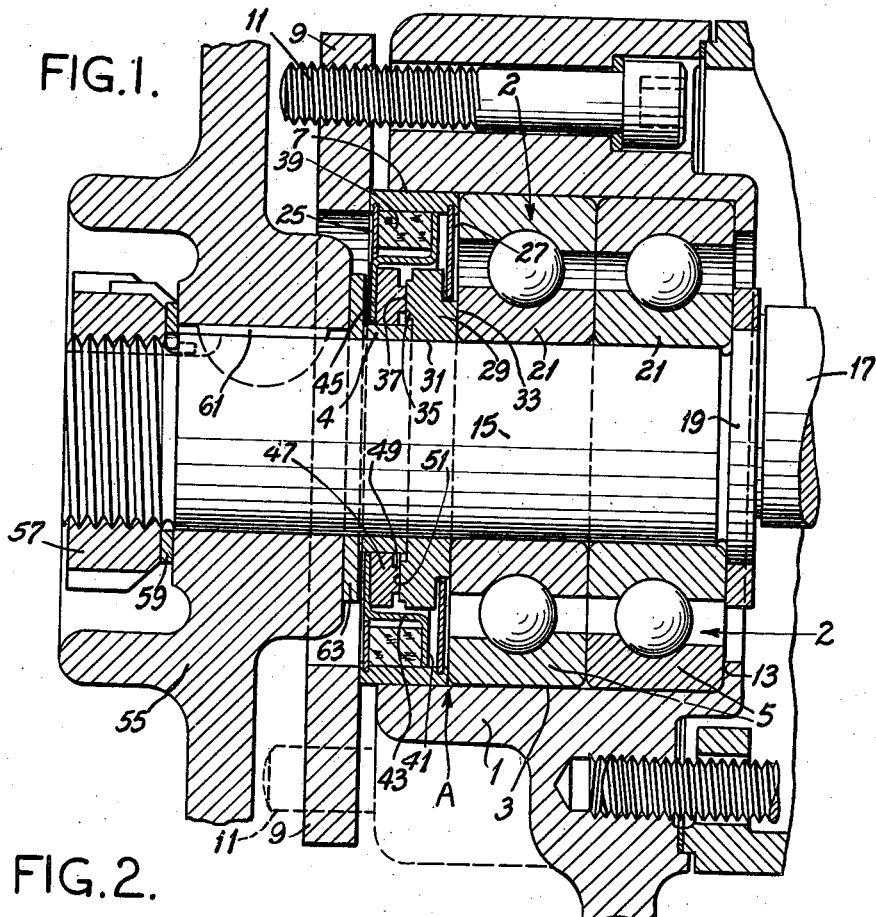
Figure 2:
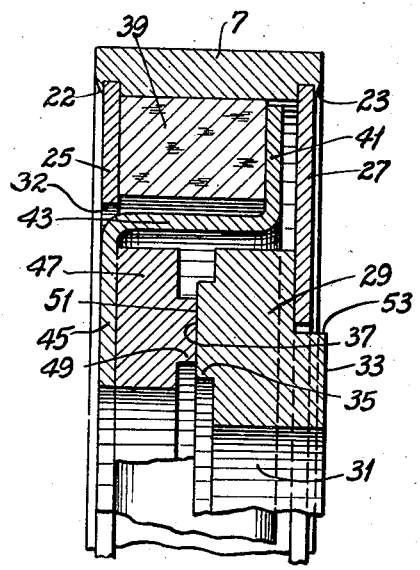

In the accompanying drawing, in which is illustrated one of various possible embodiments of the invention, Fig. 1 is a vertical section of a typical pump ball bearing showing an application of the invention thereto; and, Fig. 2 is an enlarged fragmentary section through one-half of my seal assembly.

Similar reference characters indicate corresponding parts throughout the several views of the drawing.

Rotary shaft seals are used, particularly in association with roller type bearings, in place of packing glands or stuffing boxes around shafts in order to separate the atmosphere surrounding one end or portion of the shaft from an enclosed chamber surrounding the shaft on the other side of the seal. Typically, such an installation is found in refrigerator compressors. The objection to the use of packing glands or stuffing boxes is that the packing wears both itself and the shaft so that the seal may not remain tight. There is additional objection to the loss of power due to friction.

Normally ball bearings are packed with grease or lubricated with oil. One of the functions of a seal is to prevent escape of this fluid. Another function of the seal is to prevent the flow of fluid in either direction, in the event of the different fluid pressure on two sides of the seal.

Sealing devices have been used wherein one rotary ring tight on a rotary shaft has a smooth lapped face which mates with the smooth flat surface of an abutting ring which does not rotate. The mating ring is provided with some axial movement to compensate for wear and is yieldingly pressed against the rotating ring. In order to prevent leakage around the stationary ring it is connected with a housing in the machine by some flexible or resilient means which will provide the required axial movement. Various forms of diaphragms, bellows and the like have been used for this purpose but not with entirely satisfactory results. Difficulties have been their complex, space-consuming structures, along with the fact that they have not been made up in any handy interchangeable units, as for example are ball-bearings. Many are unreliable.

Referring now more particularly to Fig. 1 there is shown at numeral 1 a stationary part of a machine casing, such as for example for a refrigerator compressor. This is counterbored as shown at 3 for receiving with close fits the outer races 5 of two ball bearing units 2. The races 5 are held in axial position by an outer ring 7 forming an outer casing part of one of my new sealing units (see also Fig. 2). This ring 7 is held by a pressure plate 9 which is held by draw studs 11. Thus the races 5 and container ring 7 of my seal are clamped between the plate 9 and the bottom shoulder 13 of the counterbore 3. None of these parts rotate, being attached to the machine frame. It may be noted that the fit between the end of ring 7 and the end of the adjacent outer ball race 5 effects a leak-proof seal.

The main rotating unit to be sealed outside of the bearings 2 is the rotary shaft 15 which in the present example is connected with a crank 17. Between the shaft 15 and the crank 17 is a shoulder 19 against which bears the adjacent one of a pair of inner races 21 of said ball bearing units 2.

Before proceeding further, I will now describe my device as an assembled unit (see Fig. 2) because its characteristics as a unit make clear how it is applied. It consists first of said outer ring 7. Held to ring 7 at spun-in shoulders 22 and 23 are end holder ring supports 25 and 27, the latter being radially deeper than the former. Within the end holder 27 is a rotating hard steel slip ring 29 having a cylindric opening 31. The fit is such as to permit axial movement under medium pressure. The ring 29 rotates with the shaft 15 and the inner race 21 of the adjacent ball bearing.

A boss 33 of the ring 29 normally extends axially out beyond the outer face of the retaining ring 27. Inside of the sealing unit, the ring 29 carries an annular pad 35, the surface 37 of which is machined smooth and polished by lapping to an optical flatness. As shown, parts of the slip ring 29 lying inside and radially beyond boss 33 also extend radially beyond the central opening in the ring 27.

Behind the narrower retaining ring 25 is inserted an annular resilient and imperforate pad 39 composed of fluid-tight cork or an oil resistant artificial rubber such as "neoprene" or the like. This snugly fits within ring 7 and seats on ring 25 providing a fluid-tight seal. The imperforate ring allows no leakage through it and responds resiliently to axial pressure. Seated on the other side of the resilient ring 39 with a fluid-tight seal is a flange 41 of a cup-shaped member 43, the latter also having an apertured inwardly directed bottom flange 45. Within this flange or bottom 45 is cemented a graphite slip ring 47. Ring 47 also carries an annular boss or pad 49 providing a flat sealing surface 51 for engagement with the optically flat surface 37 of ring 29. The axial length of the resilient ring 39 is arranged so that upon assembly of the cup 43 and rings 47 and 29 within the retaining rings 25 and 27 there will be a tendency of the resilient ring 39 to push together the surfaces 51 and 37 while seating the ring 29 against the retainer ring 27. This is before application to a bearing. The result is the projection 53 on the article as sold (Fig. 2). Reaction of the imperforate ring 39 is on the closure ring 25. All of what will be called the first slip ring 47 is nested within the cup-shaped member 43, and likewise much of what will be called the second slip ring 29.

From the above it will be seen that, when the ball bearings have been assembled in the counterbore 3, the assembly shown in Fig. 2 may be inserted into said counterbore 3, the ring 7 fitting it as desired. The outside diameter of the ring 7 is preferably standardized to be near or slightly less than that of the outside races 5 of the standard ball bearings. Then when the plate 9 is drawn up by studs 11, the boss 33 is held back by contacts with one of the inner races 21. A fluid-tight end seal occurs between 33 and adjacent inner race 21. This compresses the resilient ring 39 and places a moderate pressure on the sealing surfaces 51 and 37. Since the closure plate 27 is behind the plane of the end of ring 7, it will not be pressed against the ball bearing race but ring 7 will be. Thus the boss 33 is at this time pushed back.

Next sleeve 4 is slipped on shaft 15, followed by a slinger ring 63. Behind ring 63 is keyed member 55 which in the present example happens to be a V-belt pulley hub. This hub is held in place axially by pressure from a nut 57 acting axially through a lock washer 59. A key is shown at 61 for preventing relative rotation of hub 55 on shaft 15. Thus the hub is pressed to its final position by the nut 57 against the slinger 63. The slinger 63 pushes against sleeve 4, and the latter clamps the already described sealing slip ring 29. The clamped position of ring 29 is thus at about the optimum compression on pad 39, as determined by the original extension of boss 33 (compare Figs. 2 and 1). The sealing ring 29 thereafter simply presses the inner races 21 against the shoulder 19 with a predetermined force.

From the above, it is clear that shoulder 19 and the hub 55, in connection with the shaft 15, act as clamps for the parts 21, 29, 4 and 63, all of these parts rotating together with the shaft. The outer non-rotary parts clamped between shoulder 13 and plate 9 are constituted by members 5 and 7. Parts 25, 27, 39, 41 and 47 are stationary therewith. All rubbing occurs at surfaces 51 and 37. The medium pressure applied to these surfaces is supplied by the compressed resilient material 39, compression being determined alone by the original extension of boss 33. Design of the length of 33 for a predetermined axial pressure after assembly is based upon the assumption that in standard bearings the ends of the inner and outer races are flush (note arrow A in Fig. 1). Of course if they are not flush a suitable modification may be made in the length of boss 33.

The purpose of the slinger 63 is to keep particles of dust and grit from entering the surface between members 4 and 47 and thus also away from the rubbing surfaces 51 and 37 between the rings 47 and 29.

Several important advantages accrue from the invention. First, sealing parts are pre-assembled as shown in Fig. 2. These may be sold as a unit and standardized for quick application to bearing sizes. The units are also easily replaceable.

The factory assembly of the seal (Fig. 2) is quite easy requiring only the initial placement of the small enclosing ring 25 by spinning at 22; then the axial placement of resilient ring 39, cup 43, ring 29, and final placement of the closing ring 27 by spinning it into place at 23.

The outside diameter of the ring 7 is preferably standardized in dimensions to fit the counterbores for standard outer bearing races. This feature shows another advantage of the invention which is that the resilient member 39 for obtaining pressure between the surfaces 51 and 37 takes up no valuable axial length in the design, i. e., the ring 39 is located outside of the rings 47 and 29 and is generally in the plane of contact between rings 29 and 47. That is rings 29 and 47 are nested within ring 39. Although its position, and that of ring 7, increases the diameter of the seal assembly, the peripheral space thus used is required anyway for insertion of the bearing races 5 into the counterbore 3. Thus, the resilient member is located in waste space. It should be pointed out that in machine design, it is ordinarily important that no lengthwise space be wasted in bearing assemblies, since on a given shaft there may be several such assemblies which in the aggregate will unduly lengthen a machine if proper savings in length are not made.

The use of a resilient seal such as cork or artificial rubber for the ring 39 eliminates failure due to metal fatigue such as occurs in thin diaphragms and bellows. Furthermore compression on such a member automatically tends to seal it on ring 25, in ring 7 and under flange 41 without a very high degree of accuracy of fit between these parts.

The slip friction between surfaces 37 and 51 which depends in part upon the pressure perpendicular to these surfaces is entirely controlled by the initially designed projection 53 and length of the resilient member and not by exigencies of final assembly in the machine. This slip friction is predetermined at a low value. Generally it is desirable that the form of slip ring 29 behind retainer 27 be such as slightly to pre-compress ring 39, thus avoiding loose unit assembly (see Fig. 2). Final compression occurs of course only upon final assembly of the unit in the machine when protrusion 33 is pushed back and then locked to the shaft 15 by clamping. The opening 32 in ring 25 will accommodate the cup 43 in any position that it may assume.

If the fluid pressure on the ball bearing side of the seal is in excess, then in order for fluid to escape, this pressure must overcome the resilience of the packing ring 39. It thus may be used to act as a safety feature, relieving the fluid pressure after it exceeds a predetermined limit. On the other hand, if the pressure is in excess on the hub side opposite the ball bearings, the excess pressure will act to increase the pressure between the sealing rings 47 and 29, and cannot press into the bearing 2. Thus undesirable external elements are substantially kept out.

It will be clear that the seal will operate as successfully if the parts now rotating with shaft 15 are stationary along with that shaft, while the now stationary parts revolve. Such a construction would be a mere inversion. In either case the above mentioned advantages accrue.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. As a unitary article of manufacture, a seal assembly comprising an outer cylindric ring, a radially inwardly directed ring support adjacent one end of said outer ring and having an opening therethrough, an imperforate axially resilient ring having one end on said support, a flanged cup-shaped member nested within and having its flange supported at the opposite end of the ring of resilient material and having an apertured bottom movable in said opening, a first slip ring in the cup-shaped member and attached thereto, a relatively rotatable second slip ring engaging said attached slip ring, at least one of said slip rings being nested in said cup, and a second ring support extending radially inwardly from adjacent the other end of said outer ring and having an opening therein, and means on said second slip ring extending through and axially beyond the opening in said second support, and means on said second slip ring extending radially beyond the opening in said second ring support to retain the parts of said seal in a permanent assembly.

2. A unitary article of manufacture as specified in claim 1 but wherein the apertures in said cup-shaped member and in said first slip ring are greater than the aperture in the second slip ring for accommodating a compression member engageable with said second slip ring.

3. A unitary article of manufacture as specified in claim 1 but wherein the second slip ring in addition to its extension beyond the opening in the second support also extends beyond the adjacent end of the outer cylindric ring and in which the second slip ring is forced against the second support by some precompression in the resilient ring.

4. As a unitary article of commerce, a rotary seal assembly for a bearing having outer and inner races, comprising an outer container ring adapted to be clamped against the outer bearing race, endwise spaced containing members extending inwardly from said outer ring, relatively rotary first and second slip rings located within said outer ring and between the endwise members, the second one of said slip rings having a portion extending axially beyond one of the containing members and adapted to be deflected axially upon contact with the inner race of said bearing, an imperforate fluid-tight compression ring which is axially resilient and located in said outer containing ring and having one end abutting the other of said containing members, and a member joining the other end of the compression ring with the first one of said slip rings so that force is applied to the compression ring from said second slip ring through the first slip ring when the second slip ring is forced against said inner race of the bearing.

5. A unitary article of commerce as specified in claim 4 but wherein the apertures in said joining member and in said first slip ring are greater than the aperture in the second slip ring for accommodating a compression member engageable with said second slip ring.

HARVEY S. PARDEE.